United States Patent [19]

Gelbein

[11] Patent Number: 5,584,210

[45] Date of Patent: Dec. 17, 1996

[54] HAND BRAKE LEVER ASSEMBLY

[76] Inventor: Mark Gelbein, 24 Gun La., Levittown, N.Y. 11756

[21] Appl. No.: 502,853

[22] Filed: Jul. 14, 1995

Related U.S. Application Data

[63] Continuation of Ser. No. 143,296, Oct. 26, 1993.

[51] Int. Cl.⁶ .................. F16C 1/10; G05G 1/10
[52] U.S. Cl. .............. 74/489; 74/502.2; 403/110; 403/236
[58] Field of Search .............. 74/488, 489, 502.2; 403/110, 234, 235, 236, 261, 373

[56] References Cited

U.S. PATENT DOCUMENTS

| 4,308,761 | 1/1982 | Shimano | 74/489 |
| 4,977,792 | 12/1990 | Nagano | 74/489 |
| 5,392,669 | 2/1995 | Li | 74/502.2 |

FOREIGN PATENT DOCUMENTS

| 325445 | 12/1905 | France | 74/489 |
| 910628 | 6/1946 | France | 74/489 |
| 914346 | 10/1946 | France | 74/489 |
| 2415428 | 11/1974 | Germany | 403/110 |
| 426310 | 10/1947 | Italy | 74/488 |
| 620078 | 3/1949 | United Kingdom | 74/489 |

Primary Examiner—Charles A. Marmor
Assistant Examiner—Troy Grabow
Attorney, Agent, or Firm—Bauer & Schaffer

[57] ABSTRACT

A housing comprising a unitary block is bifurcated to form a pair of arms between which a crank lever is pivotally mounted. A circular clamp is simultaneously formed at the end of the arms to bridge the arms. The arms are adjustably drawn together to close the clamp. The crank lever is an L-shaped bell crank in which the pivot point and handle, when extended, intersect perpendicularly at a corner, forming the elbow about which the cable is pulled.

5 Claims, 2 Drawing Sheets

HAND BRAKE LEVER ASSEMBLY

This is a Continuation of Ser. No. 08/143,296, filed Oct. 26, 1993.

BACKGROUND OF THE INVENTION

The present invention relates to an improved hand brake lever assembly for bicycles.

Recent improvements in bicycles, and particularly front and rear derailleurs and gear shifting systems, have resulted in bicycles capable of enabling the biker to reach very high speeds over both smooth and rough terrain. Further, the use of esoteric metals have enabled the construction of lightweight, streamlined bikes having low air resistance, further allowing high speed racing. Nevertheless, one continuing problem exists in that the hand brake lever assembly, as commonly known and used, remains large, cumbersome, and weighty and, therefore, present an inordinate wind drag on the biker and bicycle. Another problem with the known lever assemblies is that they have relatively poor leverage action and, therefore, require relatively great strength to operate to arrest the forward movement of the bike.

An attempt has been made by several manufacturers to simplify the hand brake lever assembly. One such attempt is the Japanese, Shimano, BL-MT63 assembly. In this widely marketed assembly, the hand lever is pivotally mounted in a heavy monolithic aluminum housing. The housing is cast to form a pocket inwardly along one edge in which is mounted the lever and two heavy spring mechanism acting directly on the lever. As a result, the Japanese assembly is heavy, bulky, complex, and, therefore, far from being able to satisfy the modern needs of bikers.

In addition, a problem inherent in the Japanese assembly arises from the manner in which the handlebar clamp is fashioned. The clamp, in essence a heavy band, grows at one end out of the monolithic body and is bent so that its other end turns over the housing and is screwable into the housing. Because of the monolithic nature of the housing, the integral growth of the band from the housing and the need to screw the band at its only free end back onto the housing results in a poorly effective and weak clamp.

It is the object of the present invention to provide a bicycle hand brake assembly which overcomes the aforementioned problems and which provides an easily operable, lightweight hand brake having low drag when installed.

These objects, together with numerous other objects and advantages are set forth in the following disclosure of the present invention.

SUMMARY OF THE INVENTION

According to the present invention, a hand lever assembly is provided in which the housing comprises a one-piece block of metal bifurcated to form a pair of arms freely extending in opposition to each other and having at their free ends a circular loop bridging the arms and means for drawing the arms together to close the loop. The crank lever, to which the brake cable is attached is pivotally mounted between the arms and a lightweight tension spring provided to bias the crank lever into a rest position.

In the present invention, the arms extending in a cantilevered fashion spring at their base and, therefor can easily be drawn or pinched together evenly and uniformly. As a result, the loop clamp closes in a near perfect circle about the cylindrical handlebar, producing a sure clamping of the assembly to the handle bar. Twisting or torquing forces created by the large tension of the brake cable are thus not transmitted to the clamp.

Preferably, the block from which the housing is formed is of a lightweight but strong and durable material such as aluminum. Thus, a strong housing can be machined, the strength of which can be enhanced by the means for drawing the arms together as well as mounting the crank lever. Set screws are preferably used to compress or draw together the arms. Still further, the use of such materials provides an extremely lightweight device, which may be further lightened by providing shaped relief areas in the body.

Full details of the present invention are set forth in the following description and illustrated in the accompanying drawings.

DESCRIPTION OF THE INVENTION

Figure 1:
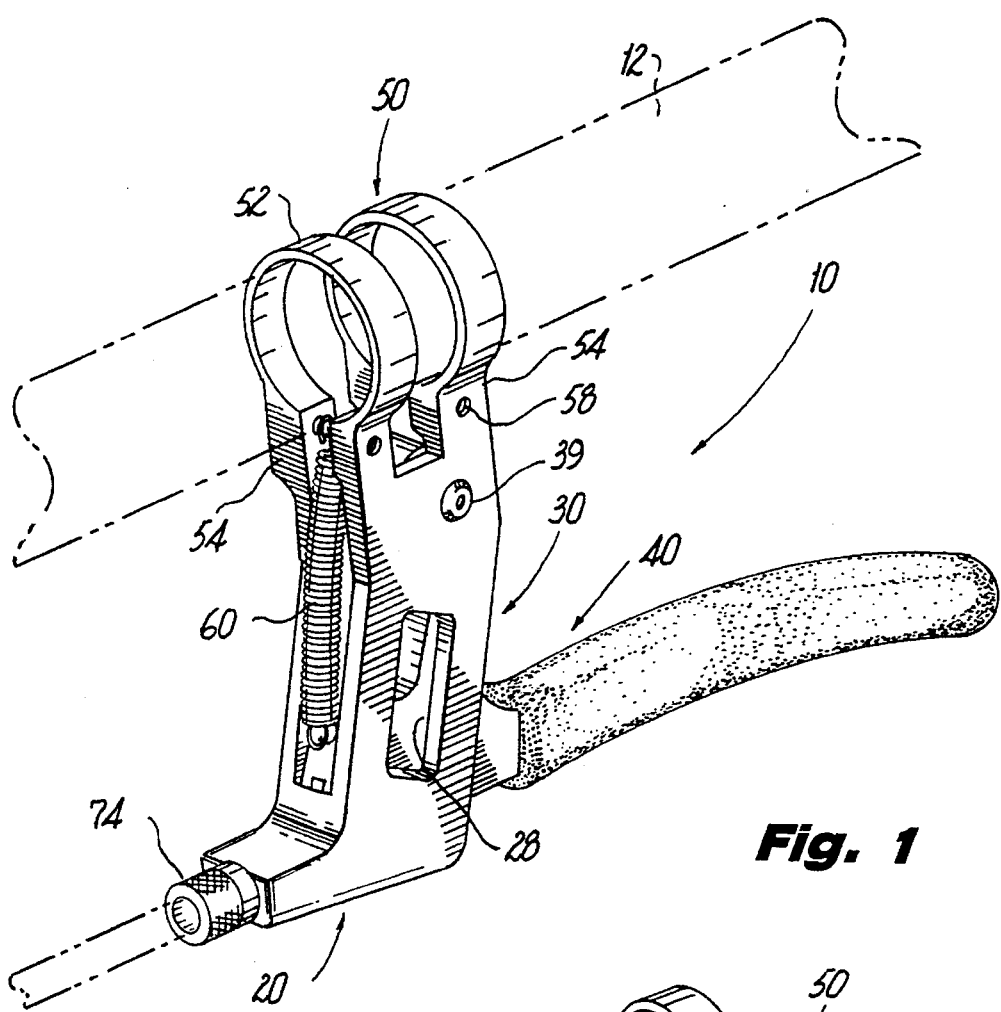
Fig. 1 is a front perspective view of the hand brake of the present invention, illustrated as applied to the handlebar of a bicycle.

As seen in the figures, the hand brake lever assembly of the present invention comprises a body, generally depicted by the numeral 10, having a base 20; a bifurcated central portion 30 in which a pivotal lever 40 is mounted; and a clamp 50 bridging the bifurcations, by which the assembly is secured to the handlebar 12 of a bicycle.

Preferably, the body 10 fashioned from a single piece of rectilinearly shaped lightweight metal such as aluminum, titanium, or the like, which is also strong and highly nonmalleable. The single piece of metal can be formed as a casting or can be worked as by cutting and shaping. The lever 40 is similarly preferably made from a single piece of metal such as that from which the body is formed.

Figure 3:
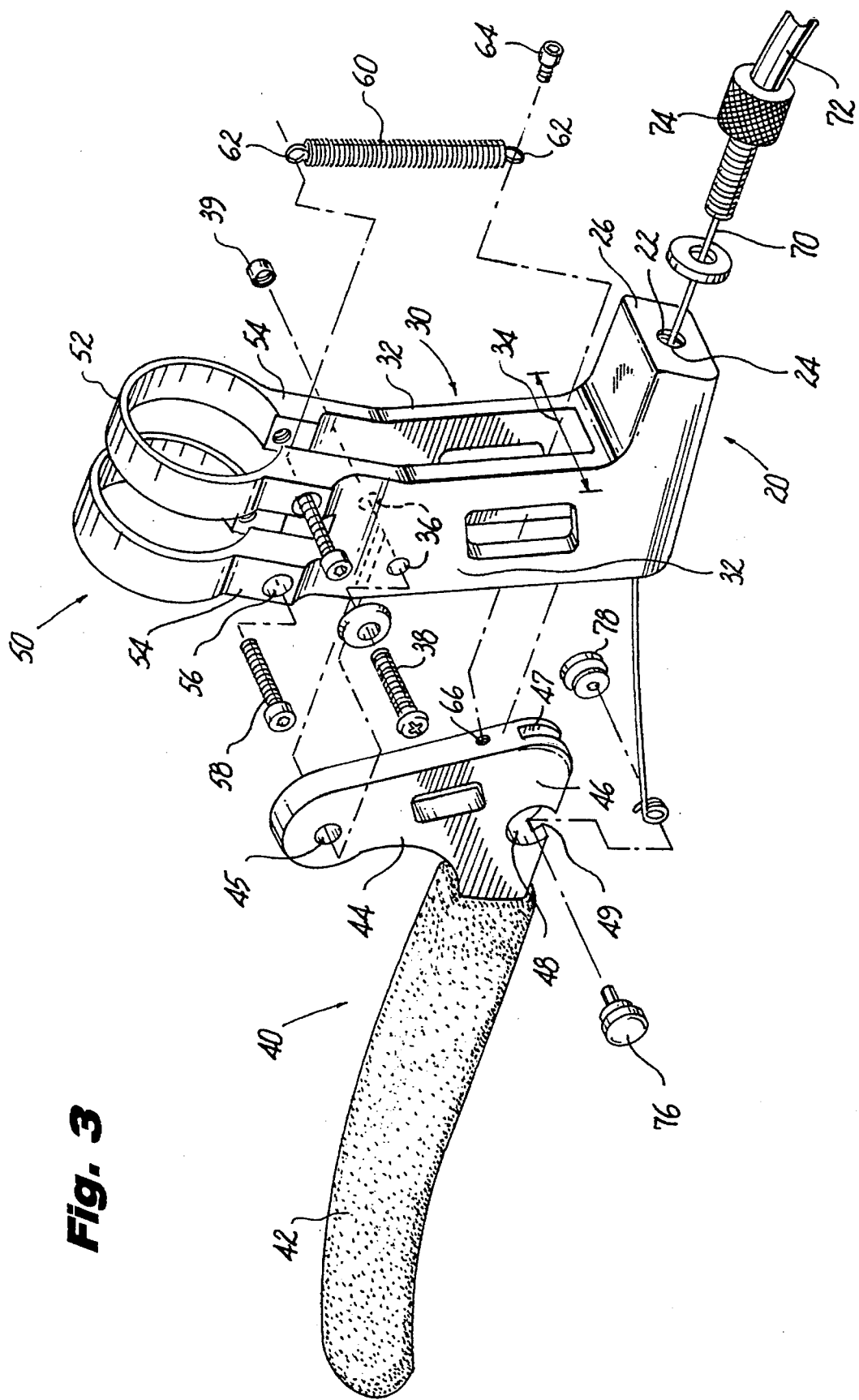
Fig. 3 is an exploded view of the hand brake of the present invention.

As seen clearly from FIG. 3, the base 20 is formed as a solid block extending forwardly of the central portion 30 and is provided with a through bore 22, generally perpendicular to the lengthwise direction of the central portion 30. The bore 22 is provided with a threaded surface 24 extending from the front face 26 of the body. The body 20 terminates in a wall 28 within the central portion 30, this wall being smooth so as to provide an abutment surface for the lever 40.

The central portion 30 comprises a pair of flat facing arms 32, spaced from each other by a distance 34 and a length which will permit the lever 40 to move freely within it. The arms 32 have a thickness which prevents the arms 32 from bending and twisting under stress and torsion as applied during the braking operation but which, because of the cantilevered length of the arms, have a degree of springlike flexibility relative to the base 20. At the upper end of each of the arms 32 but spaced from the beginning of the loops 50 are aligned holes 36, through which passes a bolt 38 on which crank 40 is hung. The bolt 38 is secured by a suitable nut 39 and provided internally with suitable spacers to prevent the crank from engaging the inner surface of the arms.

The crank 40 comprises a bell-crank of the second order, having an elongated handle 42 and an angularly disposed beam 44. The beam 44 is provided with a hole 45 at its toe-or free end, which allows the crank to be freely placed over the bolt 38, thereby forming a fixed fulcrum for the crank. The outer corner 46, i.e. at the intersection of the handle 42 and beam 44, is formed with a shallow slot 47 parallel to the faces of the crank, which extends along the lower edge of the handle 42 to terminate in a circular opening 48 in one face of the handle. The opening 48 extends laterally through the handle and is so placed along the edge of the handle 42 that a radial opening 49 is developed.

Because the bell crank of the present invention is basically L-shaped, the line between the fulcrum and the corner 46 is generally perpendicular to the handle 42, and the shallow groove 47 lies at their intersection. As a result, the moment of turning of the cable about the elbow, defined by the groove 47, is optimum and the degree of force needed to pull the cable is minimum.

The attachment clamp 50 comprises a pair of loops 52 extending integrally from the arms 32 of the central portion, each arm 32 being thickened to form a pair of laterally spaced pedestals 54, which respectively form transversely aligned pairs across the space 34 between the arms 32, upon each of which a loop section 52 is formed. At the base or ends of each loop section 52, the respective pedestals are provided with threaded bores 56, into which threaded set screws 58 are placed, thereby enabling the loop sections 52 to be tightened on the handlebar 12, merely by drawing the pedestals closer to each other. Preferably, each pedestal is buttressed for strength and so that at least one buttress could act as a spacer or stop means, preventing the excessive tightening of the loop or the narrowing of the space 34 between the arms 32. The loops can thus be tightened into a near perfect circle.

Lastly, a tension spring 60, having loops 62 at each end is secured at one end over the forwardmost set screw 58 and at its other end to the forward edge of the beam 44 by a set screw 64 threaded in a hole 66.

Figure 2:
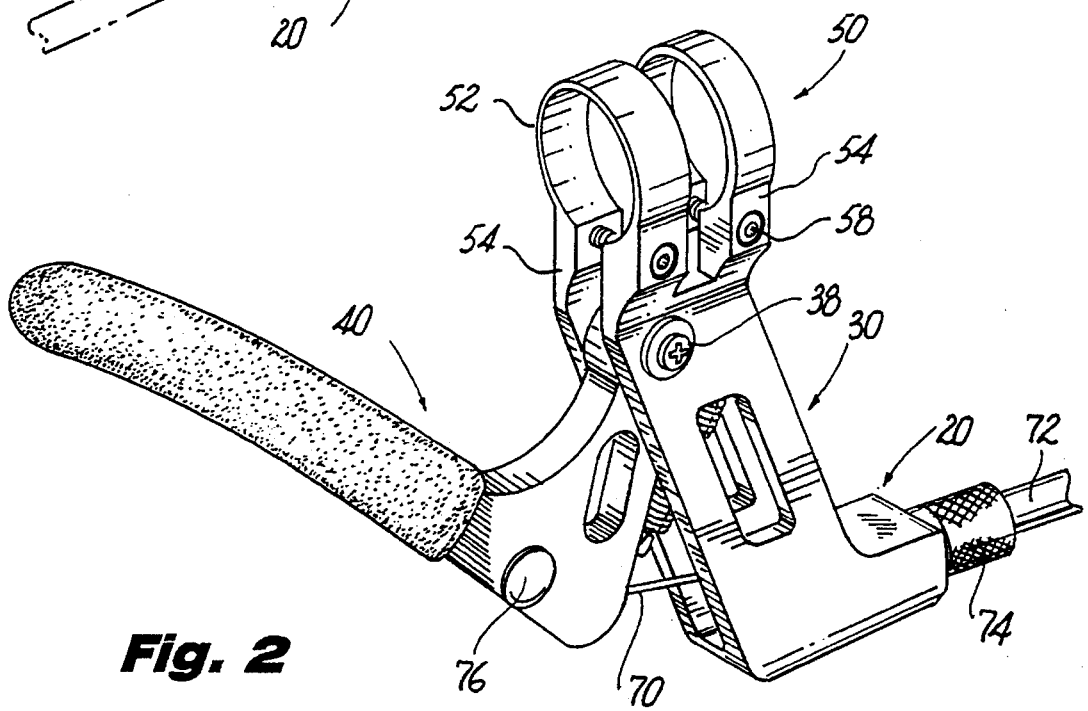
Fig. 2 is a rear perspective view of the hand brake shown in FIG. 1.

The present device may be used with any conventional brake system using a cable—that is, with a brake system acting on the bicycle wheel hub or on the wheel rim. In placing the device into use, the brake cable 70 located in a sheath 72 (FIG. 3) is inserted through the conventional cable adjuster 74, which is screwed into the bore 22 in base 20. After pivoting the handle 42 to the position seen in FIG. 2, the free end of the cable 70 is wound about a threaded post 76, which is then seated into opening 48 and held in place by nut 78, which seats in the opposite face of the lever. The cable 70 enters the opening 48 through the edge opening 49 and seats itself within the shallow corner slot 47 of the crank beam 44.

The assembly may be fitted to the handlebar of the bicycle either before or after the cable 70 is attached to the crank 40. Preferably, the device is first placed loosely onto the handbar 12 by slipping the loops 52 over the end of the handlebar. The assembly is then located to the position desired by the biker and secured into place by tightening the set screws 58 below the loops 52. Although the buttresses generally provide fixed stops, care should be taken not to overtighten the screws 58, and they should be torqued evenly.

Lastly, the cable 70 is pulled taut so that the forward edge of the crank beam 44 abuts against the inner wall 28 of base 20. The brake end of the cable 70 (not shown) is then attached in normal fashion to the brake so that it remains taut while the brake is at rest or free wheeling position. Thereafter, pulling up on the handle 42 will activate the brake in a conventional manner. Release of the handle 42 will automatically result in the pivoting of the crank 40 into its rest position, being urged into that position by the tension spring 60 and the inherent tension of the cable 70. The spring 60, therefore, does not have to be of heavy weight or apply a great deal of tension. This contributes greatly to the lightness and ease of operation of the device.

It will also be seen that the brake lever assembly of the present invention is formed of only two major, integrally formed parts—namely, the body 10 and the crank lever 40. As each of these parts is preferably formed from a single block of metal, respectively, they are light and unencumbered by weldings, fastening members, connectors, and the like. Suitable machining results in a smooth, easily operable, streamlined, attractive design.

The use of aluminum such as 6061-T6 aluminum results in a brake handle assembly of approximately 50-55 grams per assembly, less than half the weight of conventional handle assemblies.

Various modifications and changes have been disclosed herein, and others will be apparent to those skilled in this art. Therefore, it is to be understood that the present disclosure is by way of illustrating and not limiting of the present invention.

What is claimed is:

1. A hand lever assembly for operating the cable of a bicycle brake system comprising a housing and a crank lever pivotally mounted on said housing and to which the cable of the bicycle brake is attached, said housing comprising an elongated monolithic block defining at its lower end an integral closed base and at its upper end an integral closed head, and having a slot formed in said block along its length between said base and said head end forming a pair of arms extending in spaced opposition to each other at a predetermined distance when said arms are drawn together and between which the crank lever is freely located, the head comprising a circular clamp having loop sections bridging and integral with both said arms, and forming with each arm a pair of laterally spaced, transversely aligned pedestals, each pedestal being buttressed with a transversely extending enlargement below the circular clamp, at least one of said buttressing enlargements extending transversely between the arms to thereby provide stop means for limiting the arms against being drawn in contact together, screw means extending through said respectively aligned pedestals for drawing said pedestals together to close said circular clamp when attaching the assembly to the bicycle and fulcrum means extending transversely between said arms below and spaced from said pedestals on which said crank lever is mounted, said crank lever being an L-shaped bell crank having a fulcrum hole at its free end and being fully pivoted on a bolt secured in said housing between the arms thereof.

2. The assembly according to claim 1, wherein the closed end of said housing is formed with a solid base from which said arms extend cantilevered and relative to which said arms are flexible.

3. The assembly according to claim 2, wherein said base is formed with a bore through which the cable passes, said bore extending perpendicular to the vertical plane.

4. The assembly according to claim 3, wherein said bore is threaded and adapted to receive a cable adjustment mechanism.

5. The assembly according to claim 1, wherein said housing is rectilinear and the bifurcation is made in the lengthwise direction, parallel to the corresponding faces to form planar opposing arms.

* * * * *